United States Patent [19]

Moolenaar

[11] 4,274,206
[45] Jun. 23, 1981

[54] GO/NO GO PIPE DEFLECTION GAUGE

[75] Inventor: Jules Moolenaar, Santa Barbara, Calif.

[73] Assignee: Phos Incorporated, Carpinteria, Calif.

[21] Appl. No.: 58,063

[22] Filed: Jul. 16, 1979

[51] Int. Cl.$^3$ .............................................. G01B 3/34
[52] U.S. Cl. .................. 33/178 B; 33/168 R
[58] Field of Search ............ 33/178 B, 178 R, 178 F, 33/174 R, 168 R; 15/104.16, 104.05, 104.2

[56] References Cited

U.S. PATENT DOCUMENTS

| | | | |
|---|---|---|---|
| 3,423,671 | 1/1969 | Vezin | 33/178 F |
| 3,533,166 | 10/1970 | Pino, Jr. | 33/174 R |
| 3,872,600 | 3/1975 | Siminsky | 33/178 R |
| 4,088,185 | 5/1978 | Carson | 15/104.16 |

Primary Examiner—Willis Little
Attorney, Agent, or Firm—Donald D. Mon

[57] ABSTRACT

A go/no go pipe deflection gauge to be pulled through a pipe to determine whether the pipe wall has been deflected from a substantially circular cross-section. The gauge includes a spindle having an axis of length and a pair of ends. A cable can be connected to both of said ends so that the cable can pull the gauge through a pipe, and pull it back out if it becomes stuck. A plurality of vanes extends radially from the spindle. The vanes are angularly spaced from one another and extend parallel to the spindle axis. Each of the vanes has an outer boundary which includes a central substantially straight segment parallel to the axis, and a pair of end segments extending from the respective ends of the central segment toward the axis.

10 Claims, 3 Drawing Figures

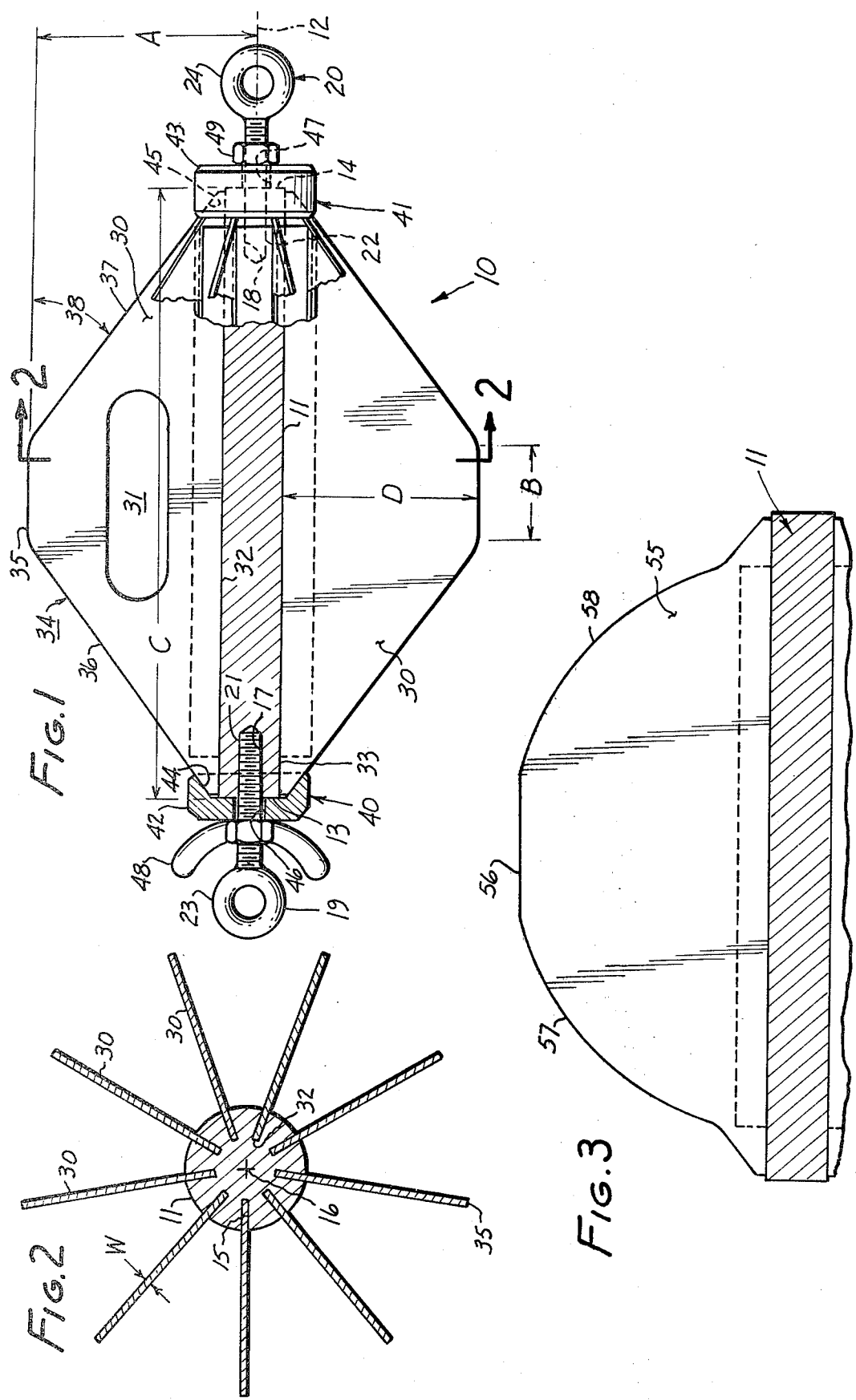

GO/NO GO PIPE DEFLECTION GAUGE

FIELD OF THE INVENTION

This invention relates to a go/no go pipe deflection gauge which is pulled through a pipe to determine whether the pipe wall has been deflected from a circular cross-section, i.e. whether it may have been collapsed by external force or weight.

BACKGROUND OF THE INVENTION

When pipelines, especially pipelines made of plastic, are laid and then covered with dirt or concrete there is the uncertainty that the completed pipeline may or may not have been completely or partially collapsed by external forces, or by the weight of the earth or concrete placed atop it. The pipe is not available for external examination because it is covered, and it is therefore necessary to run a gauge through it.

Go/no go pipe deflection gauges are known. In one form it is simply a ball which is pulled through the pipe. Another known gauge is a cage-like rod arrangement which is supported by plate-like means which substantially occludes the cross-section of the pipe. Yet another known construction involves an axial outer boundary having such a long length that the gauge cannot pass through a bend without destroying the gauge or the pipe. Gauges which substantially occlude the cross-section of the pipe are drawn through with great difficulty and sometimes cannot be drawn through at all for the reason that when the pipes are laid it is not uncommon for all kinds of debris to find their way into the pipe. The gauge will be brought to a stop by debris jammed between it and the wall of the pipe. Extra-long gauges have a tendency to jam, or to cut and destroy the pipe when pulled too hard when they encounter a bend. In all such vents, it is not possible to determine whether the pipe has collapsed, or whether some problem is created by the gauge itself.

It is an object of this invention to provide a go/no go pipe deflection gauge which can readily be pulled through a pipe without jamming against debris, which can pass through turns, and can do these things without cutting the walls, while accurately and correctly determining whether the pipe has been deflected or not.

A go/no go pipe deflection gauge according to this invention includes a central spindle which has an axis of length and a pair of ends. Cable attachment means is provided on both of these ends to which a cable can be attached for pulling the gauge through a pipe and for pulling it back out of the pipe if it becomes jammed or if the pipe has deflected. A plurality of vanes extends radially from the spindle. They are angularly spaced from one another, and are parallel to the axis. Each of them has an outer boundary which includes a central substantially straight segment parallel to the axis, and a pair of end segments which extend from respective ends of the central segment toward the axis.

According to a preferred but optional feature of the invention, there are at least nine of said vanes.

According to still other preferred but optional features of the invention, the vanes are flat, stiff, and resistant to bending, and the end segments are straight and form obtuse angles with the central section.

According to yet another preferred but optional feature of the invention, the vanes can be seated and held in slots in the spindle by means such as end caps, whereby the vanes can readily be changed so that with a single spindle, gauges of various diameters can be assembled by substituting vanes of appropriate dimensions.

The above and other features of the invention will be fully understood from the following detailed description and the accompanying drawings, in which:

FIG. 1 is a side elevation, partly in an axially cut-away cross-section, of the presently preferred embodiment of the invention;

FIG. 2 is a cross-section taken at line 2—2 in FIG. 1, and

FIG. 3 is a side elevation showing another useful embodiment of vane.

The presently preferred embodiment of a no/go pipe deflection gauge 10 according to the invention as shown in FIG. 1. At its center it has an elongated spindle 11 having an axis 12 of length with a first end 13 and a second end 14. The spindle includes a plurality of axially extending slots 15 which are preferably at least nine in number for a reason yet to be disclosed. The slots extend axially and project radially and laterally from center 16 of the spindle. Threaded holes 17, 18 at first and second ends, respectively, receive threaded eyelets 19, 20. The eyelets have threaded shanks 21, 22 and eyes 23, 24. The eyelets comprise "cable attachment means", there being one at each end of the spindle.

Vanes 30 are seated in the slots. The vanes are all indentical, except that some or all may have an aperture 31 therethrough for the purpose of reducing the weight of the structure, and for providing a hand-hold for carrying the gauge. Such apertures are optional.

The vanes are flat and plate-like and have a base 32 proportioned to fit snugly into a respective slot. The width W of the vane is about equal to the width of the slot itself so that it is restrained from tipping from side to side. Conveniently, the vane can extend nearly from end to end of the spindle although it will be recognized that different dimensional relationships can be provided instead. It will be observed that a step 33 is provided on the spindle for clearance purposes yet to be described.

The vanes also include an outer boundary 34 which includes a straight central segment 35 and a pair of end segments 36, 37. Segment 35 is preferably at the middle of the vane's length in order that the gauge will be completely reversible. The end segments should make an obtuse angle 38 with the central segments. The central segment is parallel to axis 12. Most conveniently, the end segments will be straight, and the vane substantially trapezoidal with slight rounding at the corners. This vane can conveniently be made from aircraft grade aluminum 6061 or 7075. It can conveniently be a die-stamped form.

Should interchangability of vanes not be a desired or necessary feature, the vanes can be permanently attached to the spindle or for that matter can even be a permanent and integral part of the spindle, made together with or formed from an extrusion, for example. However, the most economical arrangement is to form the spindle and vanes independently, stamping the vanes, thereby providing for interchangability. However, interchangability is not a limitation of this invention.

When interchangability is desired, the illustrated construction is most convenient. It includes retainer means 40, 41 at the first and second ends respectively. The illustrated retainer means comprise end caps 42, 43 with tapered engagement faces 44, 45 facing toward the spindle and the vanes. They overhang the vanes. Holes 46 and 47 are provided in the end caps so that they pass freely over the shanks of the eyelets. Nuts 48, 49 are threaded to the threaded shanks, and bear against the outside faces of the end caps so as to press them toward the spindle. Nut 49 is a standard nut. If desired, both nuts could be wing nuts or standard nuts as preferred.

It will be evident to persons skilled in the art that many other types of retainer means could be provided instead, such as peripheral bands and the like, but the arrangement shown has the advantage of great strength and reliability because the end caps overhang the ends of the vane to give radial restraint at the same time that their axial force give rise to a component that tends to jam the vanes more tightly into the slots.

Other shapes of outer boundaries can be provided instead. Vane 55 shown in FIG. 3 is attached to spindle 11. This vane includes a straight central segment 56 as in FIG. 1. However, its end segments 57, 58, instead of being straight, are convex. They depart from the central segment at an obtuse angle. They could also be somewhat concave if preferred. The pertinence of FIG. 3 is to illustrate that the invention is not to be limited to straight end segments, but rather to those which are close enough to a straight segment that debris will not be hooked by it. Similarly, it is evident that the end segments in all embodiments should not project laterally beyond the central segment.

The object of having a straight segment of substantial length is to give some angular stability to the gauge as it is pulled through the pipe. If the central segment were to extend the full length of the vane, one of the problems of the prior art would result because when the gauge comes to a bend in the pipe it would be unable to traverse it. One or the other of the edges would be to long to pass, and jamming or pipe damage would result. With a shorter central segment, the gauge can readily traverse a bend. It has been found that a minimum length of approximately 1⅜ inches on gauges testing pipes of 4 inches and greater inside diameter is about the minimum which can be tolerated in practical inspections. The lateral dimension A is of course determined by the inside diameter of the pipe to be gauged and will ordinarily be approximately ⅛ inch less than the pipe radius to be gauged.

While the cross-section of the vanes as seen in FIG. 2 will preferably be flat and plate like, other vane cross-sections are possible which could include thicker bases and even slight tapers. However the less occlusion the gauge causes, the less likelihood there is of hanging up or jamming on debris. In any event, the channels between adjacent vanes should not be obstructed by gauge structure.

Tests have shown that at least a minimum of nine vanes is necessary for accurately gauging whether a pipe has been deflected or not. While the central segments thereby essentially define a nine sided polygon, this provides to be close enough to a true circle to assure that if the gauge passes, the pipe is in satisfactory condition. A larger number of vanes begins to approximate the problems of a solid disk or ball, while a lesser number permits such accomodation by the gauge as to render the gauge action less reliable.

The following is a table of sizes with reference to the notations in FIG. 1 of a suitable set of dimensions for a group of pipe diameters. It is obvious that longer spindles can be used for pipes of greater diameter and they can readily be scaled from the following table.

|  |  | Pipe Diameter (inches) | | |
| --- | --- | --- | --- | --- |
|  |  | 6" | 8" | 10" |
| Vane Dimensions (Inches) | A | 2¾ | 3 11/16 | 4⅝ |
|  | B | 1⅜ | 1½ | 1⅝ |
|  | C | 10 | 10 | 10 |
|  | D | 2¼ | 3 3/16 | 4⅛ |

This invention thereby provides a reliable and convenient gauge for determining whether the wall of a pipe has been deflected. It is inexpensive to build, and easy to change vanes for various pipe sizes, so that a kit with a single spindle can be used for a plurality of pipe sizes. Because of the geometry involved, snagging of debris is less likely than in conventional devices.

This invention is not to be limited by the embodiments shown in the drawings and described in the description, which are given by way of example and not of limitation, but only in accordance with the scope of the appended claims.

I claim:

1. A go/no pipe deflection gauge to be pulled through a pipe to determine whether the pipe wall has been deflected from a circular cross-section, said gauge comprising:

a center spindle having an axis of length and a pair of ends; cable attachment means on both of said ends to which a cable can be attached for pulling said gauge through said pipe; and a plurality of vanes extending radially from said spindle, angularly spaced from one another and parallel to said axis, each of said vanes having an outer boundary which includes a central substantially straight segment parallel to said axis, and having a pair of ends, and a pair of end segments extending from respective ends of said central segment toward said axis, said vanes being stiff and resistant to bending, and there being no occlusion between any two adjacent vanes from the spindle to the outer boundaries, said spindle having a plurality of axially extending, laterally directed slots; base portions on each of said vanes fitting closely into said slots whereby to be held in place and restrained against substantial fittings; retainer means at each end of said spindle comprising a cap having a shoulder overhanging a respective end of each of said vanes to hold said vanes in said slot, and having lateral dimensions which do not appreciably exceed those of said spindle, whereby not to appreciably occlude the region between adjacent vanes, at least one of said caps being removable to permit removal and replacement of said vanes.

2. A gauge according to claim 1 in which there are at least nine of said vanes.

3. A gauge according to claim 1 in which said vanes are plate-like.

4. A gauge according to claim 1 in which said segments are straight and form an obtuse angle with said central segment.

5. A gauge according to claim 1 in which no part of any said end segment extends laterally farther from said axis than said central segment.

6. A gauge according to claim 1 in which said central segment is at least 1⅜ inches in axial length.

7. A gauge according to claim 2 in which said vanes are plate-like.

8. A gauge according to claim 7 in which said segments are straight and form an obtuse angle with said central segment.

9. A gauge according to claim 1 in which said vanes are plate-like.

10. A gauge according to claim 1 in which at least one of said vanes has an opening therethrough, whereby to facilitate carrying said gauge.

* * * * *